(12) United States Patent
Wang et al.

(10) Patent No.: US 11,681,366 B2
(45) Date of Patent: *Jun. 20, 2023

(54) GAZE TRACKING USING MAPPING OF PUPIL CENTER POSITION

(71) Applicant: Tobii AB, Danderyd (SE)

(72) Inventors: Tiesheng Wang, Danderyd (SE); Gilfredo Remon Salazar, Danderyd (SE); Yimu Wang, Danderyd (SE); Pravin Kumar Rana, Danderyd (SE); Johannes Kron, Danderyd (SE); Mark Ryan, Danderyd (SE); Torbjörn Sundberg, Danderyd (SE)

(73) Assignee: Tobii AB, Danderyd (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/574,979

(22) Filed: Jan. 13, 2022

(65) Prior Publication Data
US 2022/0137704 A1 May 5, 2022

Related U.S. Application Data

(63) Continuation of application No. 16/670,483, filed on Oct. 31, 2019, now Pat. No. 11,249,547.

(30) Foreign Application Priority Data

Oct. 31, 2018 (SE) .................................. 1851354-9

(51) Int. Cl.
*G06F 3/01* (2006.01)
*G06V 40/19* (2022.01)
*G06V 40/18* (2022.01)

(52) U.S. Cl.
CPC .............. *G06F 3/013* (2013.01); *G06V 40/19* (2022.01); *G06V 40/193* (2022.01)

(58) Field of Classification Search
CPC .......................... G02B 27/0093; G06F 3/013
See application file for complete search history.

(56) References Cited

U.S. PATENT DOCUMENTS

| | | |
|---|---|---|
| 2008/0048931 A1 | 2/2008 | Ben-Ari |
| 2008/0137909 A1 | 6/2008 | Lee et al. |
| 2014/0055342 A1 | 2/2014 | Kamimura et al. |
| 2014/0085451 A1 | 3/2014 | Kamimura et al. |

(Continued)

FOREIGN PATENT DOCUMENTS

CN 106168853 A 11/2016

*Primary Examiner* — Priyank J Shah
(74) *Attorney, Agent, or Firm* — Christopher I. Moylan

(57) ABSTRACT

Images of an eye are captured by a camera. For each of the images, gaze data is obtained and a position of a pupil center is estimated in the image. The gaze data indicates a gaze point and/or gaze direction of the eye when the image was captured. A mapping is calibrated using the obtained gaze data and the estimated positions of the pupil center. The mapping maps positions of the pupil center in images captured by the camera to gaze points at a surface, or to gaze directions. A further image of the eye is captured by the camera. A position of the pupil center is estimated in the further image. Gaze tracking is performed using the calibrated mapping and the estimated position of the pupil center in the further image. These steps may for example be performed at a HMD.

17 Claims, 8 Drawing Sheets

(56) References Cited

U.S. PATENT DOCUMENTS

2018/0032812 A1 2/2018 Sengelaub et al.
2018/0300897 A1 10/2018 Woods et al.
2019/0250705 A1* 8/2019 Zhang .................. G06F 3/0304

* cited by examiner

GAZE TRACKING USING MAPPING OF PUPIL CENTER POSITION

CROSS-REFERENCES TO RELATED APPLICATIONS

This application claims priority to U.S. patent application Ser. No. 16/670,483, filed Oct. 31, 2019, which claims priority to Swedish Application No. 1851354-9, filed Oct. 31, 2018; the content of which are hereby incorporated by reference.

TECHNICAL FIELD

The present disclosure generally relates to gaze tracking.

BACKGROUND

Different techniques have been developed for monitoring in which direction (or at which point on a display) a user is looking. This is often referred to as gaze tracking or eye tracking. One or more cameras are typically employed to capture images of the user's eyes. Image processing is employed to detect various features of the eyes in the images (for example the pupil center and reflections of illuminators at the cornea). These detected features are then employed to estimate where the user is looking. Gaze tracking may for example be employed to allow a user to control a computer (or some other type of system) via eye movement, or may be employed to enhance a virtual reality (VR) experience in a head-mounted device such as a head-mounted display (HMD). Accuracy and precision of the gaze tracking may be important for providing a good user experience. Noise in the images may affect gaze tracking performance. Another issue that may affect gaze tracking performance is that feature detection in the images captured by the camera(s) may be difficult at certain gaze angles. Features such as the pupil center and/or corneal reflections (also known as glints) may for example be difficult to detect accurately in some images. This may have a negative impact on the gaze tracking performance. One way to address this issue is to equip the gaze tracking system with additional cameras and illuminators arranged at suitable locations relative to the user's head, to ensure that cameras and illuminators are available for as many gaze angles as possible. However, such additional equipment may increase the cost of the gaze tracking system, and may occupy space which could otherwise be employed for other things than gaze tracking equipment. It would be desirable to provide new ways to address one or more of the abovementioned issues.

SUMMARY

Methods, systems and computer-readable storage media having the features defined in the independent claims are provided for addressing one or more of the abovementioned issues. Preferable embodiments are defined in the dependent claims.

Hence, a first aspect provides embodiments of a gaze tracking method. The gaze tracking method comprises obtaining a set of images of an eye captured by a camera. For each image from the set of images, the gaze tracking method comprises obtaining gaze data indicating a point at which the eye was gazing when the image was captured and/or a direction in which the eye was gazing when the image was captured, and estimating a position of a center of a pupil of the eye in the image. The gaze tracking method comprises calibrating a mapping using the obtained gaze data and the estimated positions of the center of the pupil. The mapping is adapted to map positions of the center of the pupil of the eye in images captured by the camera to gaze points of the eye at a surface, or to gaze directions of the eye. The gaze tracking method comprises obtaining a further image of the eye captured by the camera, estimating a position of the center of the pupil in the further image, and performing gaze tracking using the calibrated mapping and the estimated position of the center of the pupil in the further image.

Gaze tracking based on pupil center corneal reflection (PCCR) has been widely used in both remote gaze tracking and gaze tracking for head-mounted devices such as virtual reality (VR) headsets or augmented reality (AR) headsets. In gaze tracking for head-mounted devices, PCCR-based methods usually provide lower accuracy and precision for large gaze angles than for small gaze angles, primarily due to noise in the detection of corneal reflections in images. In gaze tracking for head-mounted devices, the headset and cameras mounted on it are typically quite stationary, and the movement of the pupil reflects the movement of the eyeball and the gaze direction. Therefore, the position of the pupil center is useful for estimating gazes. In other words, gaze tracking may be performed using a calibrated mapping and an estimated position of the center of the pupil in an image, as described above in relation to embodiments of the method according to the first aspect. Such gaze tracking may for example be employed as an alternative or complement to PCCR-based gaze tracking to improve gaze tracking performance (such as accuracy and/or precision) for at least some gaze angles or where PCCR-based gaze tracking is less reliable. Some of the issues mentioned above may occur in remote gaze tracking and therefore the invention is applicable also for remote gaze tracking.

A second aspect provides embodiments of a gaze tracking system comprising processing circuitry (or one or more processors) configured to obtain a set of images of an eye captured by a camera. For each image from the set of images, the processing circuitry is configured to obtain gaze data indicating a point at which the eye was gazing when the image was captured and/or a direction in which the eye was gazing when the image was captured, and estimate a position of a center of a pupil of the eye in the image. The processing circuitry is configured to calibrate a mapping using the obtained gaze data and the estimated positions of the center of the pupil. The mapping is adapted to map positions of the center of the pupil of the eye in images captured by the camera to gaze points of the eye at a surface, or to gaze directions of the eye. The processing circuitry is configured to obtain a further image of the eye captured by the camera, estimate a position of the center of the pupil in the further image, and perform gaze tracking using the calibrated mapping and the estimated position of the center of the pupil in the further image.

The processing circuitry (or one or more processors) may for example be configured to perform the method as defined in any of the embodiments of the first aspect disclosed herein (in other words, in the claims, the summary, or the detailed description). The system may for example comprise one or more non-transitory computer-readable storage media (or one or more memories) storing instructions that, upon execution by the processing circuitry (or one or more processors), cause the gaze tracking system to perform the method as defined in any of the embodiments of the first aspect disclosed herein.

The effects and/or advantages presented in the present disclosure for embodiments of the method according to the first aspect may also apply to corresponding embodiments of the system according to the second aspect.

A third aspect provides embodiments of a non-transitory computer-readable storage medium storing instructions which, when executed by a gaze tracking system, cause the gaze tracking system to:
a) obtain a set of images of an eye captured by a camera;
b) for each image of the set of images:
obtain gaze data indicating a point at which the eye was gazing when the image was captured and/or a direction in which the eye was gazing when the image was captured, and
estimate a position of a center of a pupil of the eye in the image;
c) calibrate a mapping using the obtained gaze data and the estimated positions of the center of the pupil, wherein the mapping is adapted to map positions of the center of the pupil of the eye in images captured by the camera to:
gaze points of the eye at a surface, or
gaze directions of the eye;
d) obtain a further image of the eye captured by the camera;
e) estimate a position of the center of the pupil in the further image; and
f) perform gaze tracking using the calibrated mapping and the estimated position of the center of the pupil in the further image.

The non-transitory computer-readable storage medium may for example store instructions which, when executed by a gaze tracking system (or by processing circuitry comprised in the gaze tracking system), cause the gaze tracking system to perform the method as defined in any of the embodiments of the first aspect disclosed herein (in other words, in the claims, the summary, or the detailed description).

The non-transitory computer-readable storage medium may for example be provided in a computer program product. In other words, a computer program product may for example comprise a non-transitory computer-readable storage medium storing instructions which, when executed by a gaze tracking system, cause the gaze tracking system to perform the method as defined in any of the embodiments of the first aspect disclosed herein.

The effects and/or advantages presented in the present disclosure for embodiments of the method according to the first aspect may also apply to corresponding embodiments of the non-transitory computer-readable storage medium according to the third aspect.

It is noted that embodiments of the present disclosure relate to all possible combinations of features recited in the claims.

BRIEF DESCRIPTION OF THE DRAWINGS

In what follows, example embodiments will be described in greater detail with reference to the accompanying drawings, on which.

All the figures are schematic, not necessarily to scale, and generally only show parts which are necessary in order to elucidate the respective embodiments, whereas other parts may be omitted or merely suggested. Any reference number appearing in multiple drawings refers to the same object or feature throughout the drawings, unless otherwise indicated.

DETAILED DESCRIPTION

Throughout the present disclosure, the term "head-mounted display" or "HMD" refers to a display device adapted to be worn at the head of a user. In addition to the actual display optics, the HMD typically also includes other components. Such other components may for example include circuits for powering the HMD, sensors for detecting motion of the HMD, gaze tracking equipment, or a casing for protecting components of the HMD. In other words, the term "head-mounted display" or "HMD" should not necessarily be construed as only referring to the actual display optics intended to be arranged in front of an eye of the user, or in front of both eyes of the user.

Throughout the present disclosure, the term "head-mounted device" refers to a device adapted to be worn at the head of a user. A head-mounted device may for example be a head-mounted display (HMD). A head-mounted device may for example comprise a display of any type. However, there are also head-mounted devices which do not comprise a display.

Gaze tracking methods, gaze tracking systems, and associated storage media will be described below with reference to FIGS. 3-15. First, certain features of an eye will be described with reference to FIGS. 1-2.

Figure 1:
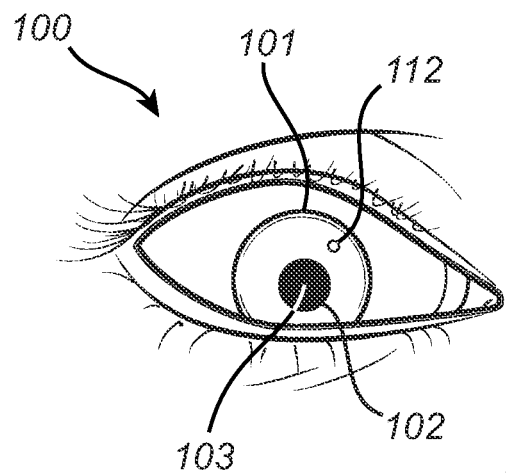
FIG. 1 is a front view of an eye.
Figure 2:
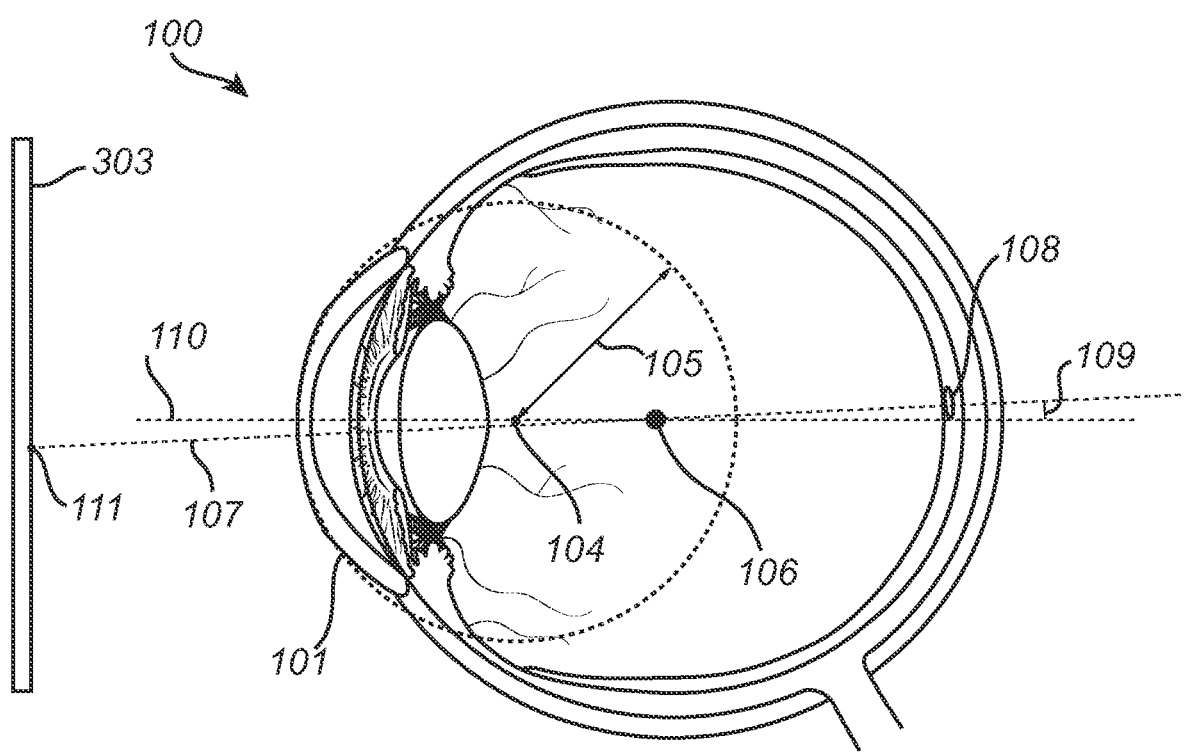
FIG. 2 is a cross sectional view of the eye from FIG. 1 from the side of the eye.

FIG. 1 is a front view of an eye 100. FIG. 2 is a cross sectional view of the eye 100 from the side of the eye 100. While FIG. 2 shows more or less the entire eye 100, the front view presented in FIG. 1 only shows those parts of the eye 100 which are typically visible from in front of a person's face. The eye 100 has a cornea 101 and a pupil 102 with a pupil center 103. The cornea 101 is curved and has a center of curvature 104 which is simply referred as the cornea center 104. The cornea 101 has a radius of curvature referred to as the radius 105 of the cornea 101, or simply the cornea radius 105. The eye 100 has a center 106. The visual axis 107 of the eye 100 passes through the center 106 of the eye 100 to the fovea 108 of the eye 100. The visual axis 107 forms an angle 109 relative to the optical axis 110 of the eye 100. The deviation or offset between the visual axis 107 and the optical axis 110 is often referred to as the fovea offset 109. FIG. 1 also shows a reflection 112 of an illuminator at the cornea 101. Such a reflection 112 is also known as a glint.

Figure 3:
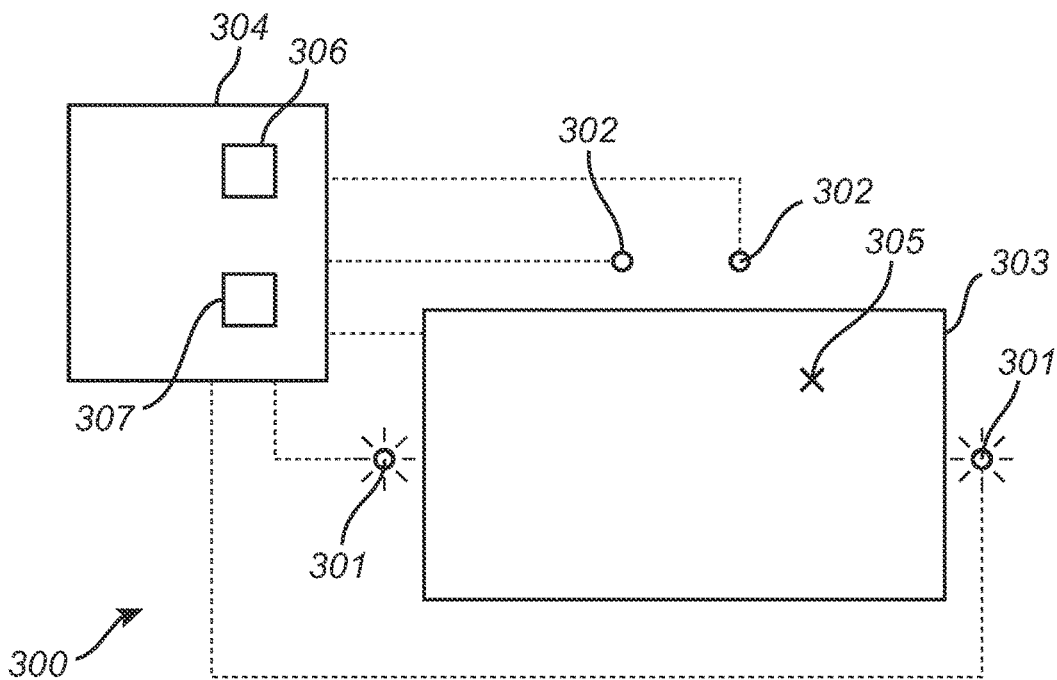
FIG. 3 is a schematic overview of a gaze tracking system, according to an embodiment.

FIG. 3 is a schematic overview of a gaze tracking system 300, according to an embodiment. The system 300 comprises one or more illuminators 301 for illuminating the eye 100 and one or more cameras 302 for capturing images of the eye 100 while the eye 100 looks at a display 303. The system 300 also comprises processing circuitry 304 configured to estimate where the eye 100 is looking. The processing circuitry 304 may for example estimate a gaze direction (or gaze vector) of the eye 100 (corresponding to a direction of the visual axis 107), or a gaze point 111 of the eye 100 at the display 303 (as shown in FIG. 2).

The processing circuitry 304 is communicatively connected to the illuminators 301 and the cameras 302, for example via a wired or wireless connection. The processing circuitry 304 may also be communicatively connected to the display 303, for example for controlling (or triggering) the display 303 to show test stimulus points 305 for calibration of the gaze tracking system 300.

The illuminators 301 may for example be infrared or near infrared illuminators, for example in the form of light emitting diodes (LEDs). However, other types of illuminators may also be envisaged. FIG. 3 shows example illuminators 301 located at either side of the display 303, but the illuminators 301 could be located elsewhere.

The cameras 302 may for example be charged-coupled device (CCD) cameras or Complementary Metal Oxide Semiconductor (CMOS) cameras. However, other types of cameras may also be envisaged. FIG. 3 shows example cameras 302 located above the display 303, but the cameras 302 could be located elsewhere, for example below the display 303.

The display 303 may for example be comprised in the gaze tracking system 300, or may be regarded as separate from the gaze tracking system 300. The display 303 may for example be a liquid-crystal display (LCD) or a LED display. However, other types of displays may also be envisaged. The display may 303 may for example be flat or curved. The display 303 may for example be a TV screen, a computer screen, or may be part of a head-mounted device such as a virtual reality (VR) or augmented reality (AR) device. The display 303 may for example be placed in front of one of the user's eyes. In other words, separate displays 303 may be employed for the left and right eyes. Separate gaze tracking equipment (such as illuminators 301 and cameras 302) may for example be employed for the left and right eyes.

The processing circuitry 304 may be employed for gaze tracking for both eyes, or there may be separate processing circuitry 304 for the left and right eyes. The gaze tracking system 300 may for example perform gaze tracking for the left and right eyes separately, and may then determine a combined gaze point as an average of the gaze points for the left and right eyes.

The processing circuitry 304 may for example comprise one or more processors 306. The processor(s) 306 may for example be application-specific integrated circuits (ASIC) configured to perform a specific gaze tracking method. Alternatively, the processor(s) 306 may be configured to execute instructions (for example in the form of a computer program) stored in one or more memories 307. Such a memory 307 may for example be comprised in the circuitry 304 of the gaze tracking system 300, or may be external to (for example located remotely from) the gaze tracking system 300. The memory 307 may store instructions for causing the gaze tracking system 300 to perform a gaze tracking method.

It will be appreciated that the gaze tracking system 300 described above with reference to FIG. 3 is provided as an example, and that many other gaze tracking systems may be envisaged. For example, the illuminator(s) 301 and/or the camera(s) 302 need not necessarily be regarded as part of the gaze tracking system 300. The gaze tracking system 300 may for example consist only of the processing circuitry 304. There are even gaze tracking systems that do not employ illuminators at all. As described below with reference to FIGS. 4-5, a gaze direction 107 or a gaze point 111 may be estimated without use of illuminators 301. As described below with reference to FIG. 15, the system 300 may for example be employed to perform gaze tracking for a head-mounted device.

Figure 4:
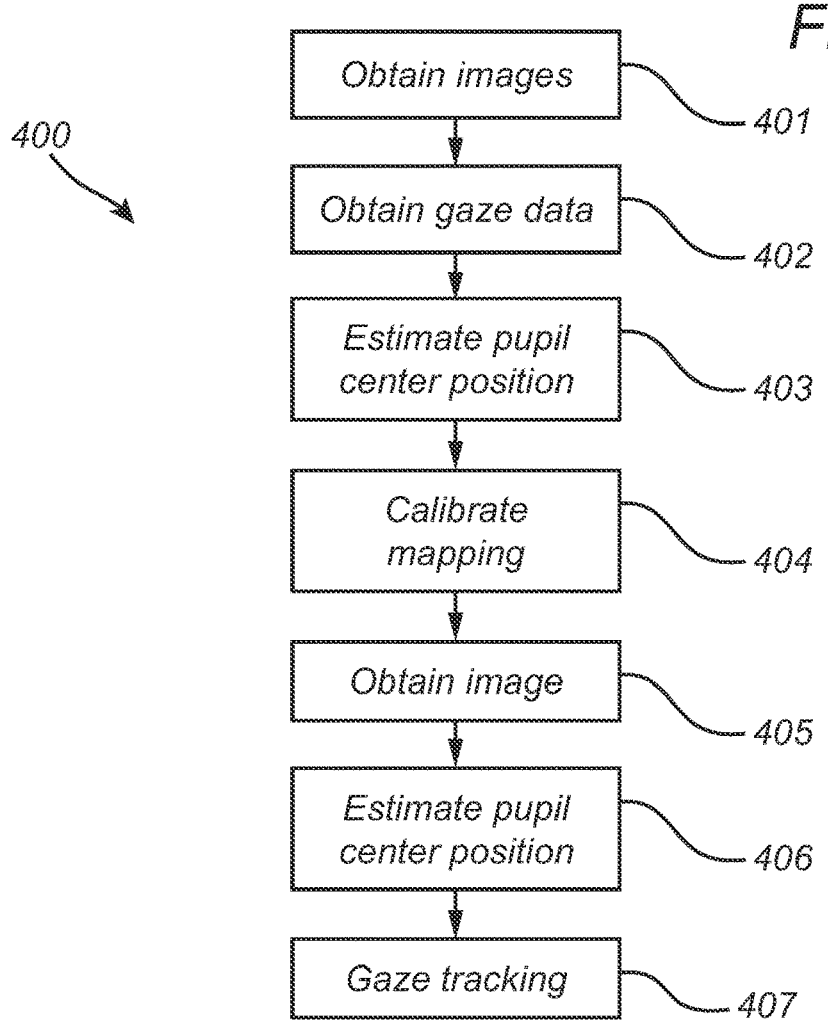
FIG. 4 is a flow chart of a gaze tracking method, according to an embodiment.

FIG. 4 is a flow chart of a gaze tracking method 400, according to an embodiment. The gaze tracking method 400 comprises obtaining 401 (or receiving) a set of images of an eye 100 captured by a camera 302. The images may for example be obtained in the form of snap shots, or as part of a video sequence. The images may for example be received from the camera 302, either directly from the camera 302 or indirectly from the camera 302 (for example via one or more other components of the gaze tracking system 300). The camera 302 may for example be arranged at a fixed position relative to the user's head (or relative to the user's face), such as at a head-mounted device (for example a HMD). The images captured by the camera 302 may for example capture the same view of the user's face, but at different time instances (or points in time).

The method 400 comprises obtaining 402 (or receiving) gaze data for each of the images. The gaze data indicates a point 111 at which the eye 100 was gazing (or is assumed/believed to have been gazing) when the image was captured and/or a direction 107 in which the eye 100 was gazing (or is assumed/believed to have been gazing) when the image was captured. As described below with reference to FIG. 6, the obtained 402 gaze data may for example indicate a known position of a reference stimulus employed for calibration. Alternatively, the obtained 402 gaze data may have been determined (or computed or estimated) by some gaze tracking technique, such as PCCR. The step 402 of obtaining the gaze data may for example comprise receiving the gaze data or computing the gaze data.

The method 400 comprises estimating 403 a position of a center 103 of a pupil 102 of the eye 100 in each of the images. This estimation 403 may for example be performed via image analysis. The edge (or at least part of the edge) of the pupil 102 may for example be detected in an image, and the position of the pupil center 103 may be estimated based on the detected pupil edge. In some images, the edge of the pupil 102 may be difficult to detect. This may for example happen if the iris is so dark that it is of similar color as the pupil 102. The edge (or at least part of the edge) of the iris may then be detected in the image, and the position of the pupil center 103 may be estimated based on the detected edge of the iris. The images captured by the camera 302 may for example be digital images. The position of the pupil center 103 in an image captured by the camera 302 may be estimated as one or more pixels in the image.

The method 400 comprises calibrating 404 a mapping (or model, or function) using the obtained gaze data and the estimated positions of the center 103 of the pupil 102. The mapping (or model, or function) is adapted to map positions of the center 103 of the pupil 102 of the eye 100 in images captured by the camera 302 to gaze points 111 of the eye 100 at a surface, or to gaze directions 107 of the eye 100. In other words, the mapping (or model, or function) is adapted to predict gaze points 111 of the eye 100 at a surface and/or gaze directions 107 of the eye 100 using the positions of the center 103 of the pupil 102 of the eye 100 in images captured by the camera 302. The calibration 404 may for example include setting values for one or more parameters of the mapping (or model, or function) using the obtained gaze data and the estimated positions of the center 103 of the pupil 102.

An image captured by the camera 302 provides a two-dimensional representation of the area imaged by the camera 302. This two-dimensional representation may be regarded as plane, which is referred to herein as an image plane. In other words, the images captured by the camera 302 may be considered to represent an image plane, and the mapping employed in the method 400 may be considered to be adapted to map positions of the center 103 of the pupil 102 in the image plane to gaze points 111 of the eye 100 at a plane distinct from the image plane, or to gaze directions 107 of the eye 100. Hence, for a position of the center 103 of the pupil 102 of the eye 100 in the image plane (in other words, in an image captured by the camera 302) the mapping is adapted to provide (or output) a gaze point 111 of the eye 100 at a surface distinct from the image plane, or to provide (or output) a gaze direction 107 of the eye 100.

Figure 5:
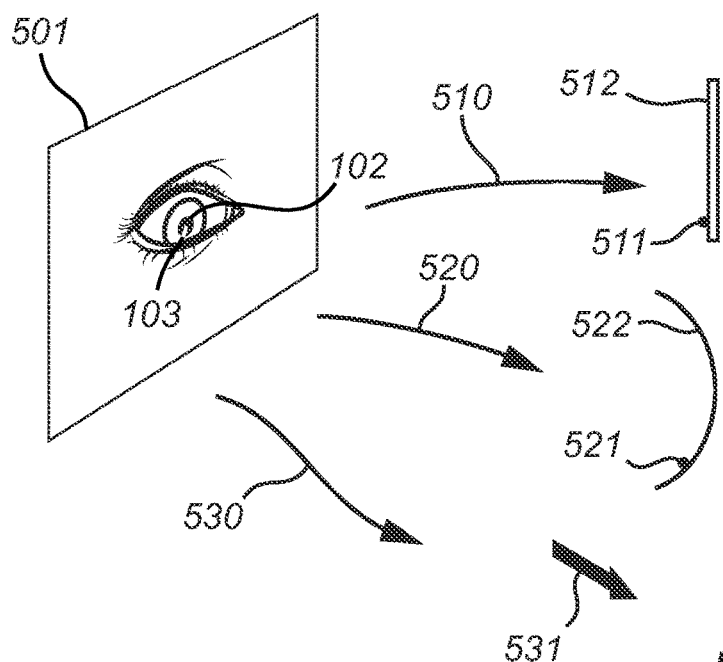
FIG. 5 illustrates example mappings which may be employed in the method from FIG. 4, according to some embodiments.

FIG. 5 illustrates example mappings which may be employed in the method 400, according to some embodiments. As illustrated in FIG. 5, a first example mapping 510 maps a position of the pupil center 103 in an image 501 captured by the camera 302 to a gaze point 511 at a flat surface 512 (or plane). The flat surface 512 may for example be a flat display, such as a flat display of a head-mounted device. The first example mapping 510 may be regarded as a mapping from pupil center positions in images captured by the camera 302 to gaze points at a plane distinct from the image plane represented by the images. A second example mapping 520 shown in FIG. 5 maps a position of the pupil center 103 to a gaze point 521 at a curved surface 522. The curved surface 522 may for example be a curved display, such as a curved display of a head-mounted device. Although the curved surface 522 depicted in FIG. 5 is concave, embodiment may also be envisaged in which the surface 522 is convex, or has other some other non-flat shape. The curved surface 522 may for example be parabolic. The second example mapping 520 may be regarded as a mapping from pupil center positions in images captured by the camera 302 to gaze points at a surface distinct from the image plane represented by the images. A third example mapping 530 shown in FIG. 5 maps a position of the pupil center 103 to a gaze direction 531. The gaze direction 531 may for example be provided in the form a vector or ray with a certain position in space, or may be provided in the form of a direction without a position in space.

The method 400 comprises obtaining 405 a further image of the eye 100 captured by the camera 302. The further image may for example be obtained in the form of a snap shot, or as part of a video sequence. The further image may for example be received from the camera 302, either directly from the camera 302 or indirectly from the camera 302 (for example via one or more other components of the gaze tracking system 300). The further image may for example capture the same view of the user's face as the other images captured by the camera 302, but at a different time instance (or point in time).

The method 400 comprises estimating 406 a position of the center 103 of the pupil 102 in the further image. This estimation 406 may for example be performed via image analysis. The edge (or at least part of the edge) of the pupil 102 may for example be detected in the further image, and the position of the pupil center 103 may be estimated based on the detected pupil edge. The edge of the pupil 102 could be difficult to detect. This may for example happen if the iris is so dark that it is of similar color as the pupil 102. The edge (or at least part of the edge) of the iris may then be detected in the further image, and the position of the pupil center 103 may be estimated based on the detected edge of the iris. The further image may for example be a digital image. The position of the pupil center 103 in the further image may for example be estimated as one or more pixels in the further image.

The method 400 comprises performing 407 gaze tracking using the calibrated mapping and the estimated position of the center 103 of the pupil 102 in the further image. The gaze tracking 407 may for example involve estimating a gaze point 111 and/or a gaze direction 107. Example implementations of the gaze tracking 407 will be described below with reference to FIGS. 12-14.

According to some embodiments, the mapping employed in the method 400 is adapted to map positions of the pupil center 103 in images captured by the camera 302 to gaze points at a surface (such as the plane 512 and the curved surface 522 shown in FIG. 5), and the gaze data obtained at the step 403 for each image indicates a point at this surface at which the eye 100 was gazing when the image was captured. Such an embodiment will now be descried with reference to FIG. 6 which shows a pattern of known stimulus points 601 which may be employed for the calibration 404 in the method 400.

In the present embodiment, the first example mapping 510 from FIG. 5 is employed. During a personal calibration process, the user is prompted (or instructed or requested) to look at a number of stimulus points 601. The gaze tracking system 300 may for example provide instructions to the user via a text message at the display 303 or via an audio message. Pupil center positions 103 are estimated 403 and corresponding known stimulus point positions 601 are employed to calibrate 404 the mapping 510. Suppose that K stimulus points $$\{S_0=(x_{g,0},y_{g,0}),\ldots,S_{K-1}=(x_{g,K-1},y_{g,K-1})\}$$

are shown in to the user during the calibration. For each stimulus point $S_k$, a number $N_k$ of pupil center positions are collected for respective time instances. In total $$N=N_0+N_1+\ldots+N_{K-1}$$

pupil center positions $$\{(x_{p,0},y_{p,0}),\ldots,(x_{p,N-1},y_{p,N-1})\}$$

are collected for the K stimulus points, where each pupil center position has a corresponding stimulus point position. The two functions f and g in the following equations (1) and (2) are then fitted to the calibration data.

$$x_g=f(x_p,y_p) \quad (1)$$

$$y_g=h(x_p,y_p) \quad (2)$$

These two functions f and g define the mapping 510 and are employed in the step 407 to perform gaze tracking. In one example implementation, the functions f and g are linear function in accordance with the following equations (3) and (4):

$$x_g = ax_p + by_p + c \quad (3)$$

$$y_g = dx_p + ey_p + f \quad (4)$$

where a, b, d and e are slopes, and c and f are intercepts of the linear functions. These six parameters are estimated (or computed) from the calibration data. Methods like least-squares can be used to estimate values for the parameters a, b, c, d, e and f.

The functions f and g could also be polynomials of higher degree, as long as N is at least as large as the number of parameters to be estimated in such higher degree polynomials. However, embodiments may also be envisaged in which the functions f and g are not polynomials.

After the calibration 404 has been completed via knows stimulus points 601 at the surface 512, the functions f and g can be employed to estimate gaze points ($x_g$, $y_g$) at the surface 512 for new images captured by the camera 302 by replacing $x_p$ and $y_p$ in equations (1) and (2) by the positions of the pupil center 103 detected in the new images.

As an alternative to the above equations (1)-(4), the mapping 510 could be defined via homography in accordance with the following equation:

$$[x_g y_g 1]^T = H[x_p y_p 1]^T$$

The first example mapping 510 maps cornea center positions from an image plane to a flat surface 512 and could be linear (as exemplified in equations (3) and (4) above) or nonlinear. The second example mapping 520 maps cornea center positions from an image plane to a curved surface 522 and is typically nonlinear. The third example mapping 530 maps cornea center positions from an image plane to gaze directions and could be linear or nonlinear.

Hence, according to some embodiments, the mapping employed in the method 400 may for example be a linear mapping, a nonlinear mapping, or a homography.

As described above with reference to FIG. 6, known stimulus points 601 may be employed for the calibration 404. Hence, according to some embodiments, at least one image from the set of obtained 401 images was captured when the eye 100 was gazing at a stimulus point 601. The gaze data obtained 402 for that image indicates a known position 601 of the stimulus point and/or a known direction from the eye 101 towards the stimulus point 601.

The gaze tracking method 400 described above with reference to FIG. 4 may for example be employed as an alternative or complement to PCCR-based gaze tracking to improve gaze tracking performance (such as accuracy and/or precision) for at least some gaze angles. Performance of PCCR-based gaze tracking is often lower for large gaze angles than for small gaze angles. The method 400 described above with reference to FIG. 4 may for example be employed for improving gaze tracking performance for large gaze angles. Such embodiments will be described below with reference to FIGS. 7-8.

Figure 7:
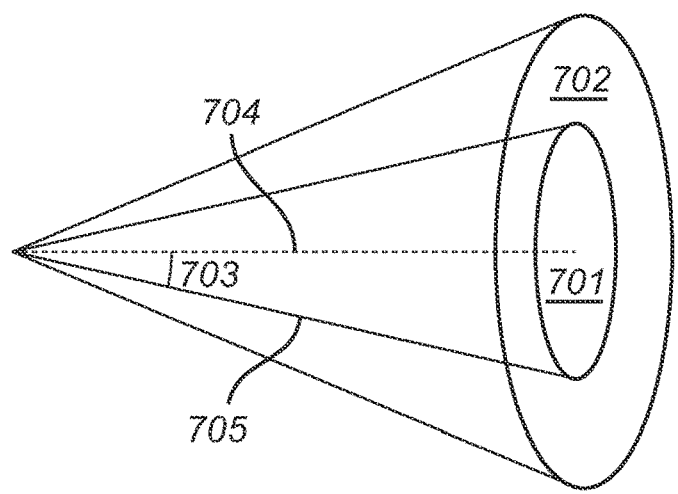
FIG. 7 shows different regions in a field of view of an eye.

FIG. 7 shows different regions in a field of view of an eye 100. The field of view includes a central region 701 and an outer region 702. The central region 701 may for example correspond to gaze angles 703 up to a threshold value, such as gaze angles up to 5 degrees, or up to 10 degrees, or up to 25 degrees. The outer region 702 may for example correspond to gaze angles 703 larger than the threshold value, such as gaze angles above 5 degrees, or above 10 degrees, or above 25 degrees. The gaze angle 703 may for example be measured as an angle between a forward direction 704 and a gaze direction 705 of the eye 100. The gaze angle 703 may for example be measured as an angle between a forward direction 704 of the user's head and a gaze direction 705 of the eye 100. The gaze angle 703 may for example be measured as an angle between a forward direction 704 in the gaze tracking system's coordinate system and a gaze direction 705 of the eye 100.

Figure 8:
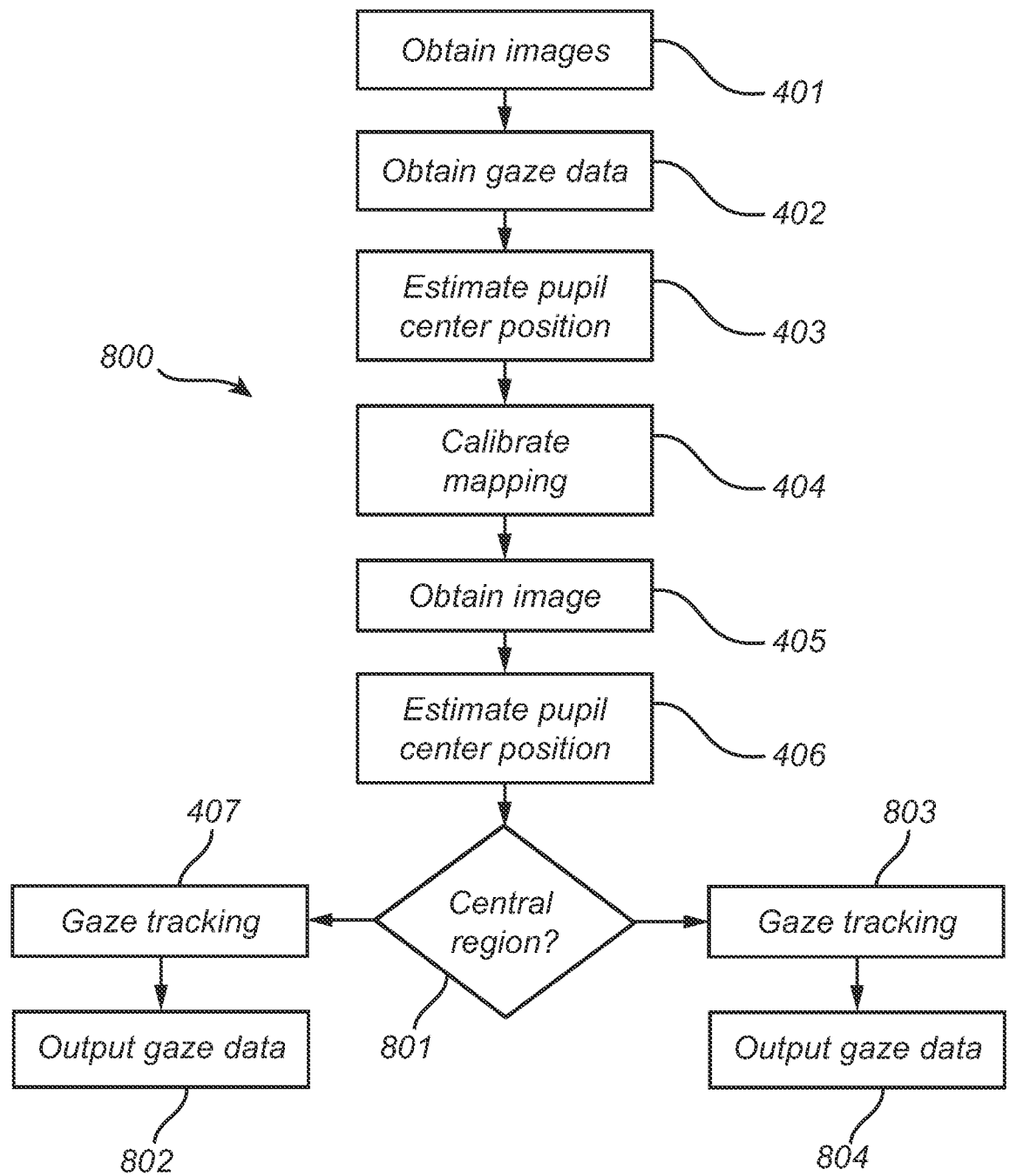
FIG. 8 is a flow chart of a gaze tracking method involving different types of gaze tracking for the different regions in FIG. 7, according to an embodiment.

FIG. 8 is a flow chart of a gaze tracking method 800 involving different types of gaze tracking for the different regions shown in FIG. 7, according to an embodiment. The method 800 includes the same six initial steps 401-406 as the method 400 described above with reference to FIG. 4. The description of those steps will not be repeated here.

The method 800 comprises estimating 801 whether the eye 100 is directed towards (or gazes towards) the central region 701 of the field of view of the eye 100. This estimation 801 may for example be performed via PCCR (as described below with reference to FIG. 10), but could be performed in some other way.

If the eye 100 is directed towards a region outside said central region 701 (such as the outer region 702 which may for example correspond to gaze angles above 5 degrees, or above 10 degrees, or above 25 degrees), the method 800 continues by outputting 802 gaze data (for example indicating a gaze direction or gaze point) determined by performing 407 the gaze tracking that uses the calibrated mapping and the estimated position of the center 103 of the pupil 102 in the further image obtained at the step 405 described above with reference to FIG. 4. The step 407 of performing gaze tracking using the calibrated mapping could for example be performed only when the eye 100 is directed towards a region 702 outside the central region 701 (as indicated in FIG. 8), or could be performed regardless of where the eye 100 is directed.

If the eye 100 is directed towards the central region 701 (for example corresponding to gaze angles up to 5 degrees, or up to 10 degrees, or up to 25 degrees), the method 800 continues by outputting 804 gaze data (for example indicating a gaze direction or gaze point) determined by performing 803 a second type of gaze tracking different from the gaze tracking performed in the gaze tracking step 407. The step 803 of performing the second type of gaze tracking could for example be performed only when the eye 100 is directed towards the central region 701 (as indicated in FIG. 8), or could be performed regardless of where the eye 100 is directed.

In the present embodiment, the second type of gaze tracking 803 is a PCCR-based scheme which uses an estimated position of a reflection 112 (also known as a glint) of an illuminator 301 at the cornea 101 of the eye 100 and an estimated position of the pupil center 103 of the eye 100. Gaze tracking performance for PCCR-based gaze tracking is typically lower for large gaze angles than for small gaze angles due to noise in the estimation of the glint positions. In a setting where the camera 302 is arranged at a fixed position relative to the user's head (such as in a head-mounted device), the first type of gaze tracking 407 (which involves use of the mapping described above with reference to FIGS. 4-5) may provide better gaze tracking performance than PCCR-based gaze tracking 803. The ability of the method 800 to output 802 gaze data from a first type of gaze tracking 407 (involving use of the mapping) for larger angles and to output 804 gaze tracking data from PCCR-based gaze tracking 803 for smaller gaze angles (where PCCR-based gaze tracking performs well) allows gaze tracking performance to be improved for at least some of the gaze angles in the outer region 702. This advantage is also available in embodiments where the second type of gaze tracking 803 is not PCCR-based, as long as the first type of gaze tracking 407 can perform better than the second type of gaze tracking for at least some gaze angles in the outer region 702.

In a PCCR-based gaze tracker which does not employ the first type of gaze tracking 407, additional cameras 302 and/or illuminators 301 could be arranged at suitable locations in an attempt to improve gaze tracking performance for large gaze angles. However, such additional equipment may increase the cost of the gaze tracking system, and may occupy space which could otherwise be employed for other things than gaze tracking equipment. The method 800 described above with reference to FIG. 8 provides an alternative way of dealing with large gaze angles, which does not require use of additional cameras 302 or illuminators 301. This may reduce power consumption and/or improve eye safety (due to reduced number of illuminators)

It will be appreciated that the step 801 of estimating whether the eye 100 is directed towards the central region 701 or the outer region 702 does not necessarily need to be a high quality (or high precision/accuracy) estimate. A rough estimate would typically suffice, since the first type of gaze tracking 407 and the second type of gaze tracking 803 may both perform relatively well for gaze angles close to the boundary between the central region 701 and the outer region 702. In other words, gaze tracking performance may not be affected that much if the "wrong" type of gaze tracking is accidentally employed for a gaze angle close to the boundary between the central region 701 and the outer region 702.

The gaze data output by the method 800 described above with reference to FIG. 8 may for example indicate a gaze point 111 and/or a gaze direction 107. The gaze data may for example be provided as output from a gaze tracking system (such as the gaze tracking system 300 described above with reference to FIG. 3), or may be provided as output from a subsystem or portion of a gaze tracking system to another subsystem or portion of the gaze tracking system.

Figure 9:
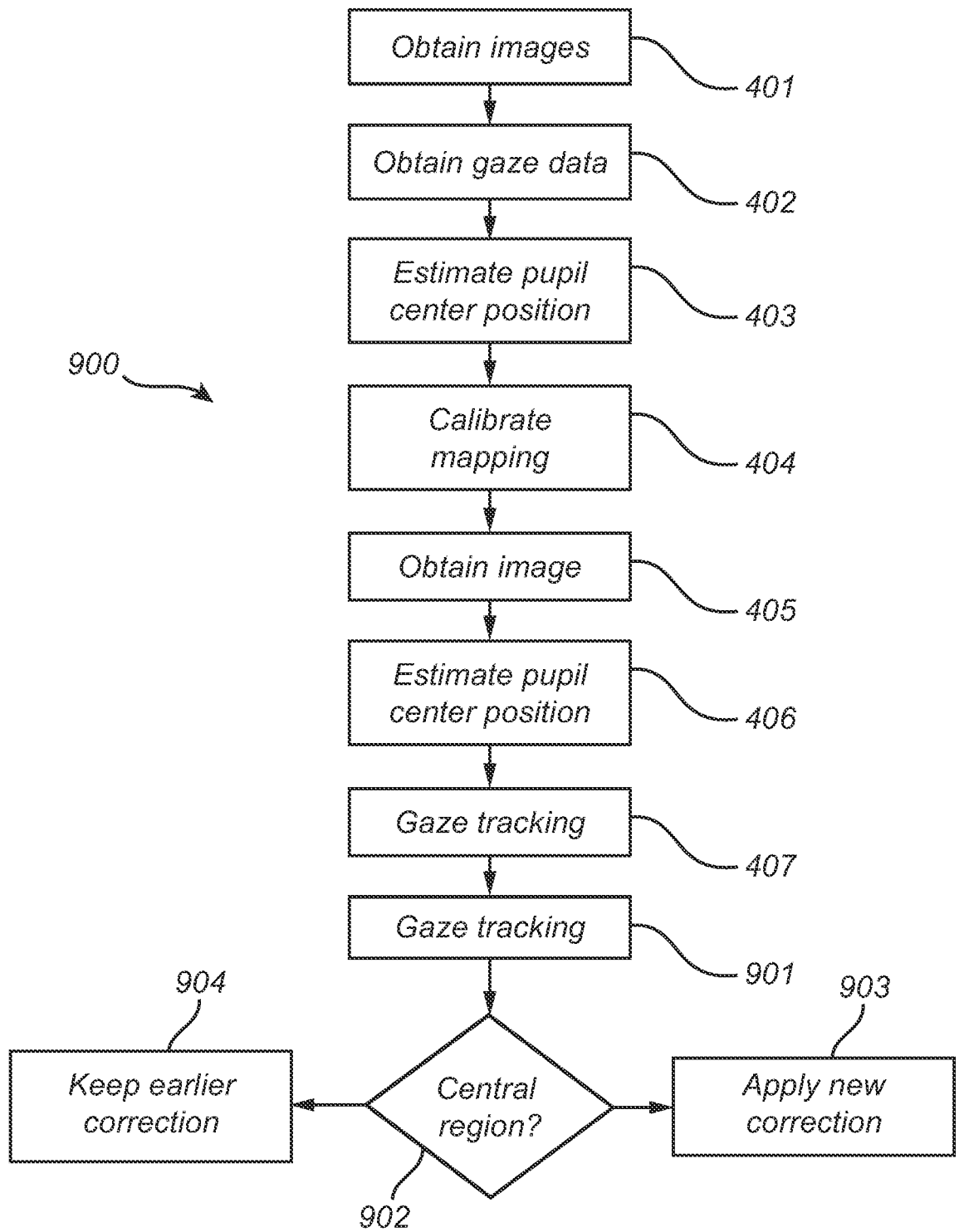
FIG. 9 is a flow chart of a gaze tracking method involving correction of a mapping employed for gaze tracking, according to an embodiment.

FIG. 9 is a flow chart of a gaze tracking method 900 involving correction of the mapping described above with reference to FIGS. 4-5, according to an embodiment. If the camera 302 is moved or relocated relative to the user's head after calibration of the mapping, the mapping may need to be corrected (or recalibrated) to take this relocation into account. Even if the camera 302 is mounted at a head-mounted device, the camera 302 could be dislocated if the head-mounted device slips. A gaze tracking method that performs well for small gaze angles (such as PCCR-based gaze tracking) may be employed to detect relocation of the camera 302 when the eye is directed towards the central region 701 (which corresponds to small gaze angles), and may also be employed to determine an appropriate correction to be applied the mapping described above with reference to FIGS. 4-5. This idea is employed in the method 900.

The method 900 comprises the initial seven steps 401-407 from the method 400 described above with reference to FIG. 4. The description of these steps is not repeated here. However, recall that the seventh step 407 relates to performing a first type of gaze tracking which employs a calibrated mapping and an estimated position of a pupil center 103 in an image.

The method 900 comprises performing 901 a second type of gaze tracking different than the first type of gaze tracking (that uses the calibrated mapping and the estimated position of the center 103 of the pupil 102 in the further image). In the present embodiment, the second type of gaze tracking is a PCCR-based gaze tracking scheme which uses an estimated position of a reflection 112 (also known as a glint) of an illuminator 301 at the cornea 101 of the eye 100 and an estimated position of the pupil center 103 of the eye 100. However, the second type of gaze tracking could be some other type of gaze tracking.

The method 900 comprises estimating 902 whether the eye 100 is directed towards the central region 701 of the field of view of the eye 100. This estimation 901 may for example be performed via PCCR (as described below with reference to FIG. 10), but could be performed in some other way.

If the eye 100 is directed towards the central region 701 (for example corresponding to gaze angles up to 5 degrees, or up to 10 degrees, or up to 25 degrees), the method 900 proceeds by applying 903 a correction to the mapping (in other words, to the mapping described above with reference to FIGS. 4-5) based on gaze data obtained via the second type of gaze tracking. The gaze data obtained via the second type of gaze tracking may for example indicate a different gaze direction and/or gaze point than the gaze data obtained via the first type of gaze tracking, which may indicate that the mapping employed by the first type of gaze tracking needs to be corrected. The correction applied to the mapping in step 903 may for example be applied to the mapping until a new/updated correction is deemed necessary, or until the eye 100 is once again directed towards the central region 701. In other words, the correction which is determined when the eye 100 is directed towards the central region 701 may be continued to be employed also when the eye 100 is directed towards the outer region 702.

If the eye 100 is directed towards a region 702 (for example corresponding to gaze angles above 5 degrees, or above 10 degrees, or above 250 degrees) outside the central region 701, the method 900 may for example proceed by a step 904 where a previously determined correction is maintained, or (if for example no correction has yet been determined) the mapping may be employed without correction. Since the PCCR-based gaze tracking performs better for small gaze angles, it may be better to determine a correction of the mapping when the eye 100 is directed towards the central region 701 than when the eye 100 is directed toward the outer region 702.

An explicit example of how to apply the correction in step 903 will now be described. For simplicity, consider an example where the first type of gaze tracking 407 employs an invertible mapping M that maps a pupil center position $(x_p, y_p)$ to a gaze point $(x_g, y_g)$ in accordance with the following equation:

$$(x_g, y_g) = M(x_p, y_p)$$

Assume that the second type of gaze tracking 901 reveals that the gaze point should in fact be $(x'_g, y'_g)$ which deviates from the estimated gaze point $(x_g, y_g)$. Applying the inverse $M^{-1}$ of the mapping M to the "true" gaze point we get a point $$(x'_p, y'_p) = M^{-1}(x'_g, y'_g)$$

which would yield the "true" gaze point $(x'_g, y'_g)$ if subjected to the mapping M. A deviation between the points $(x_p, y_p)$ and $(x'_p, y'_p)$ indicates that the camera 302 that captured the images has been relocated after calibration of the mapping M. If the camera 302 is mounted at a head-mounted device, this relocation may be caused by slippage of the head-mounted device. To compensate for this relocation, we can to determine a correction mapping R that handles potential translation and/or reorientation of the camera 302 such that $$(x'_p, y'_p) = R(x_p, y_p)$$

and thereby $$(x'_g, y'_g) = M(R(x_p, y_p)).$$

We would like the mapping R to work for all points ($x_p$, $y_p$), so several pairs ($x_p$, $y_p$) and ($x'_p$, $y'_p$) may be needed to determine a suitable correction mapping R to be employed with M. Hence, after a set of data samples with enough variation has been collected, the correction mapping R may be determined. If, for example, the camera 302 has slipped to the left relative to the user's head, then the correction mapping R could be a simple translation. If, for example, the mapping M is linear and is defined by the equations (3) and (4), then applying a correction function R with the mapping M may simply correspond to recalibrating the six parameters a, b, c, d, e and f. In other words, instead of using R and M, one could simply use a new mapping M' with new values for six parameters a, b, c, d, e and f. If, on the other hand, the mapping M is a more complicated non-linear mapping with many parameters, then determining the correction mapping R may be easier (and/or require less data samples) than recalibrating the entire mapping M.

Another example of how to apply the correction in step 903 is estimating a compensation ($\Delta_c^x$, $\Delta_c^y$) based on the samples of the deviation ($x'_g$, $y'_g$)−($x_g$, $y_g$). For instance, a mean filter of the deviations. Then it is applied such that:

$$(x_g, y_g) = M(x_p, y_p) + (\Delta_c^x, \Delta_c^y)$$

In one example, the compensation is updated only when the eye 100 is directed towards the central region 701.

The second type of gaze tracking 901 could for example be performed only when the eye 100 is directed towards the central region 701, or could be performed regardless of where the eye 100 is directed (as indicated in FIG. 9).

It will be appreciated that the step 902 of estimating whether the eye 100 is directed towards the central region 701 or the outer region 702 does not necessarily need to be a high quality (or high precision/accuracy) estimate. A rough estimate would typically suffice, since the second type of gaze tracking 901 may perform relatively well also for gaze angles close to the boundary between the central region 701 and the outer region 702. In other words, gaze tracking performance may not be affected that much if a new correction is applied 903 even if the gaze angle is slightly outside the central region 701 where PCCR-based gaze tracking performs at its best.

Figure 10:
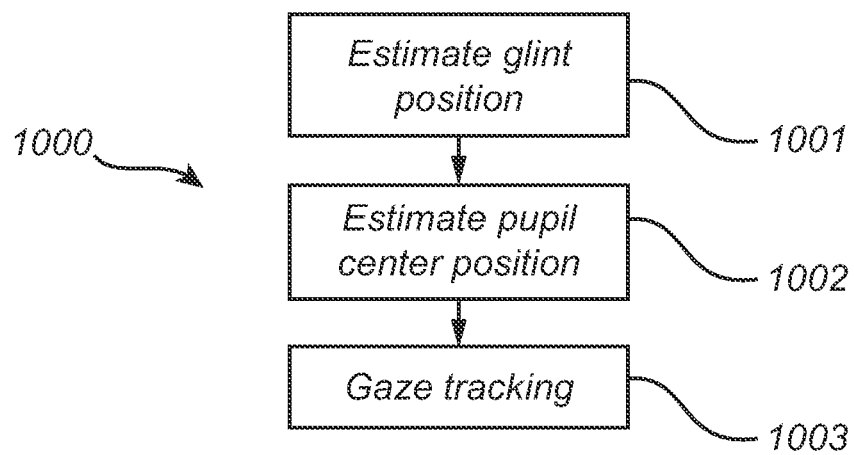
FIG. 10 is a flow chart of PCCR type gaze tracking which may be employed in the methods in FIGS. 8-9, according to some embodiments.

FIG. 10 is a flow chart of a PCCR-based gaze tracking scheme 1000 which may be employed in the methods in FIGS. 8-9, according to some embodiments. The PCCR gaze tracking 1000 may for example be employed in the gaze tracking step 803 of the in the method 800 or in the gaze tracking step 901 in the method 900. The PCCR gaze tracking 1000 may for example be employed in step 801 in the method 800 or the step 902 in the method 900 to estimate whether the eye 100 is directed towards the central region 701 of the field of view of the eye 100.

If the PCCR gaze tracking 1000 is employed, then the further image employed for the gaze tracking was captured while the eye 100 was illuminated by one or more illuminators 301. The PCCR gaze tracking 1000 comprises estimating 1001 one or more positions of one or more reflections 112 of the one or more illuminators 301 at a cornea 101 of the eye 100 in the further image, and estimating 1002 a position of the center 103 of the pupil 102 of the eye 100 in the further image.

Gaze tracking is the performed 1003 using the estimated position(s) of the corneal reflection(s) 112 and the estimated pupil center position 103. The gaze tracking 1003 may for example provide a gaze point 111 and/or a gaze direction 107.

Figure 11:
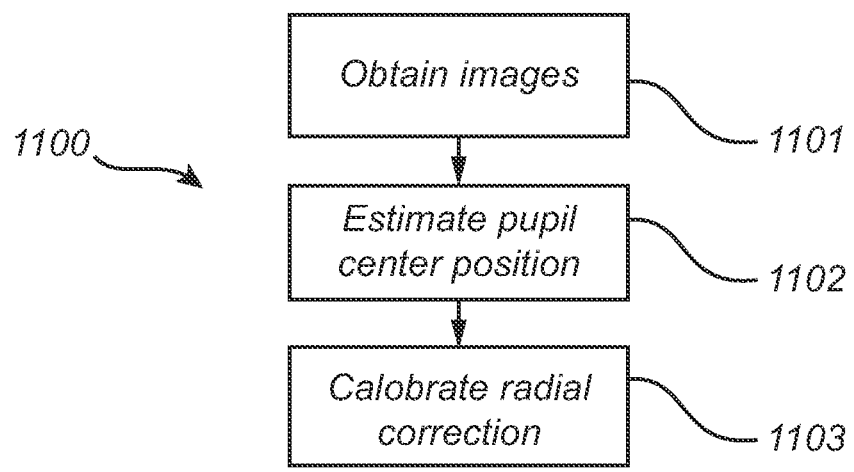
FIG. 11 is a flow chart of how to determine radial correction for a mapping employed in gaze tracking, according to an embodiment.

FIG. 11 is a flow chart of how to determine radial correction for the mapping described above with reference to FIGS. 4-5, according to an embodiment. For large gaze angles, gaze points estimated via the gaze tracking step 407 described above with reference to FIG. 4 typically deviate somewhat from the true gaze points in a radial direction. By the radial direction is meant a direction extending radially out from the center of the field of view of the eye 100. A radial correction may be applied to compensate for such deviations. Hence, in the present embodiment, the step 407 of performing gaze tracking using the calibrated mapping and the estimated position of the center 103 of the pupil 102 in the further image comprises applying a radial correction to the mapping. The radial correction involves use of a correction function. The size of the correction function depends on a gaze angle of the eye 100. The size of the correction function may for example increase when the gaze angle increases. The correction function may for example be linear or nonlinear.

For simplicity, consider the case where the mapping maps pupil center positions 103 to gaze points 111 in a plane (as exemplified by the mapping 510 in FIG. 5). In this setting, the radial correction applied to the mapping may for example be expressed as $$f(\alpha)v$$

where $\alpha$ is the gaze angle, f is a scalar function, and v is a vector directed radially out from the center of the field of view of the eye 100. Hence, if the mapping without radial correction is denoted by M and the coordinates of the pupil center position are given by $x_p$ and $y_p$, then the gaze point coordinates $x_g$ and $y_g$ may be computed as $$\begin{pmatrix} x_g \\ y_g \end{pmatrix} = M \begin{pmatrix} x_p \\ y_p \end{pmatrix} + f(\alpha)v$$

The function may for example be non-negative or positive. The function f may for example be zero for small gaze angles. The function f may for example increase when the gaze angle $\alpha$ increases. The function f may for example be linear or nonlinear. The vector v may for example have length 1 (in other words, v may have unit length).

The correction function may be calibrated as part of the calibration step 404 described above with reference to FIG. 4, or may be calibrated via a separate calibration procedure. FIG. 11 is a flow chart for such a calibration procedure 1100. The calibration procedure 1100 is performed prior to applying the radial correction to the mapping.

Figure 6:
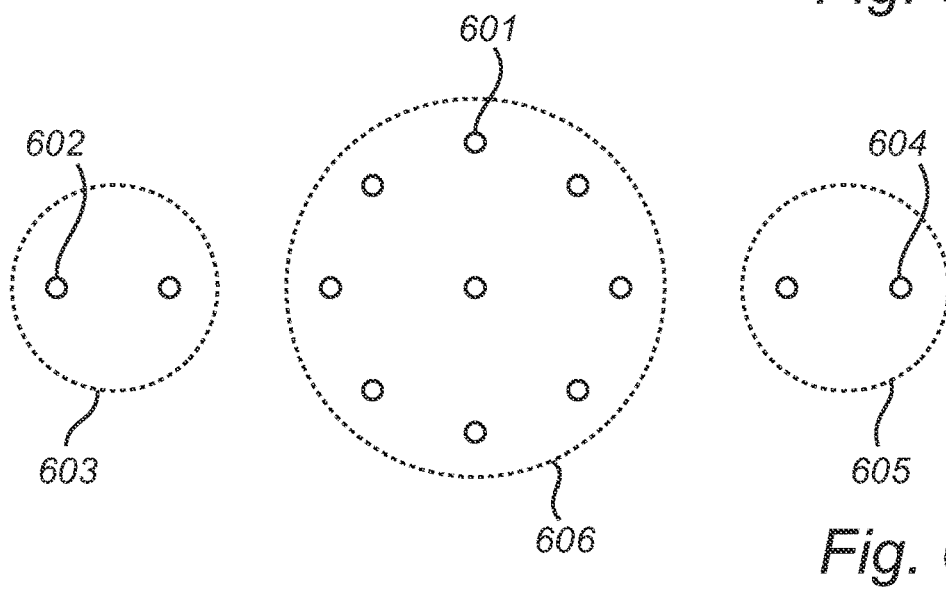
FIG. 6 shows a pattern of known stimulus points which may be employed in the method from FIG. 4, according to an embodiment.

The calibration procedure 1100 comprises obtaining 1101 a plurality of images of the eye 100 captured by the camera 302 when the eye 100 was gazing at respective known stimulus points. FIG. 6 shows examples of such stimulus points 601, 602, 604. In the present embodiment, at least one of the stimulus points corresponds to a gaze angle of at least 5 degrees, or at least 10 degrees, or at least 25 degrees. Examples of such stimulus points corresponding to large gaze angles are provided in FIG. 6 as stimulus points 602 in at a left hand side 603 and stimulus point 604 at a right hand side 605.

The calibration procedure 1100 comprises estimating 1102 positions of the center 103 of the pupil 102 of the eye 100 in the plurality of images.

The calibration procedure comprised calibrating 1103 the correction function using positions of the known stimulus points 601, 602 604, the estimated positions of the center 103 of the pupil 102 of the eye 100 in the plurality of images, and the mapping (the mapping described above with reference to FIG. 4, and exemplified in FIG. 5 by the mappings 510, 520 and 530).

In the example stimulus point pattern shown in FIG. 6, the stimulus points in the central region 606 are employed for calibrating the mapping (the mapping described above with reference to FIG. 4, and exemplified in FIG. 5 by the mappings 510, 520 and 530), while the stimulus points 602 far out to the left 603 and the stimulus points 604 far out to the right 605 are employed to calibrate the radial correction function. Hence, a relatively simple mapping (such as a linear mapping) may be employed for the gaze tracking, supplemented by a relatively simple radial correction for large gaze angles. A single camera 302 may be sufficient, and there may be no need for illuminators 301. In contrast, if a purely PCCR-based gaze tracking system were to be designed to handle such large gaze angles, multiple illuminators 301 and/or cameras 302 may have to be distributed at various locations to ensure that illuminators 301 and cameras 302 are available for all gaze angles.

Figure 12:
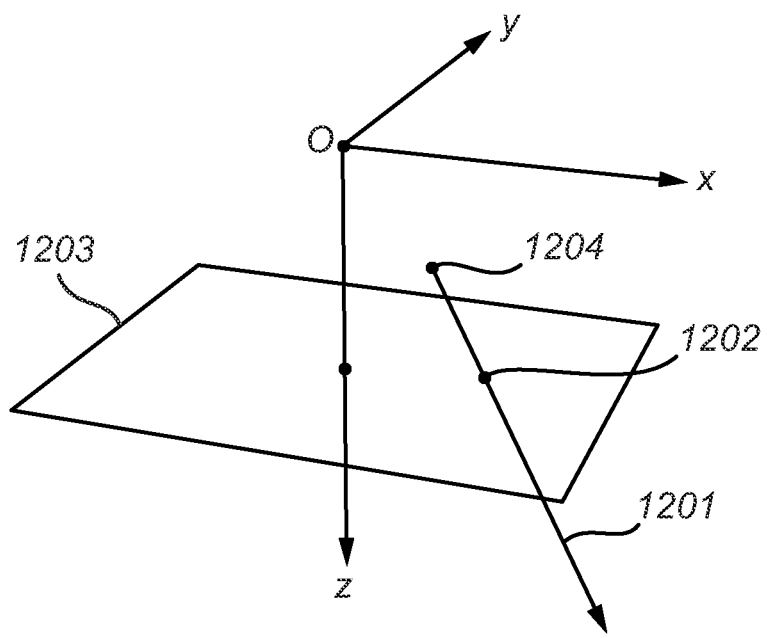
FIGS. 12-13 illustrate different ways of how a gaze direction may be determined, according to an embodiment.
Figure 14:
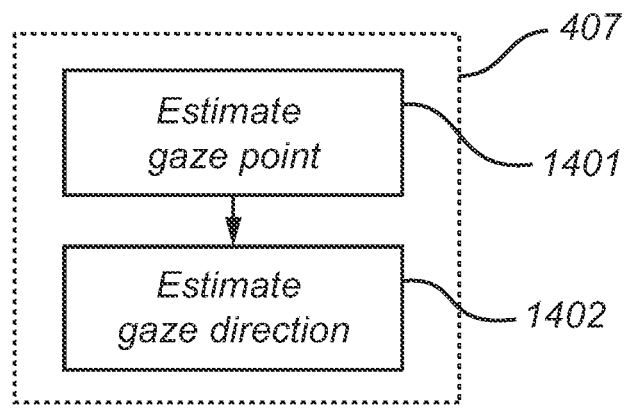
FIG. 14 is a flow chart of a way of performing gaze tracking in the method from FIGS. 4, 8 and/or 9, according to an embodiment.

FIG. 14 is a flow chart of how the gaze tracking step 407 in the method 400 described above with reference to FIG. 4 (or in the methods 800 and/or 900 described above with reference to FIGS. 8-9) may be performed, according to an embodiment. The present embodiment will be described with reference to FIG. 12 which illustrates how a gaze ray 1201 may be determined. FIG. 12 shows the coordinate system of the gaze tracking system. The coordinate system includes axes x, y and z, and an origin O of the coordinate system. The axis z is directed towards the user's face. User distance (or depth) is measured along the z axis.

In the present embodiment, the mapping described above with reference to FIG. 4 is adapted to map positions of the center 103 of the pupil 102 of the eye 100 in images captured by the camera 302 to gaze points 1202 of the eye 100 at a surface 1203 (like the first example mapping 510 in FIG. 5). In the present embodiment, the step 407 of performing gaze tracking using the calibrated mapping and the estimated position of the center 103 of the pupil 102 in the further image comprises estimating 1401 a gaze point 1202 at the surface 1203 by applying the mapping to the estimated position of the center 103 of the pupil 102 in the further image, and estimating 1402 a gaze direction 1201 (or gaze ray) as a line or vector through a reference point 1204 of the eye 100 and through the estimated gaze point 1202 at the surface 1203.

The reference point 1204 is a point through which the gaze ray 1201 passes, and may for example be regarded as a gaze origin for the gaze ray 1201. The center 104 of corneal curvature (also referred to as cornea center 104 and shown in FIG. 2) may for example be employed as the reference point 1204. Hence, the reference point 1204 employed for gaze tracking using the further image may be a center 104 of corneal curvature estimated based on the further image. The cornea center 104 may for example be estimated via PCCR.

In the example implementation described above, the reference point (or gaze origin) 1204 is a variable position which is determined for each image during the gaze tracking. However, embodiments may also be envisaged in which the reference point 1204 is a fixed position which is employed for determining gaze rays for multiple images and time instances. For example, centers of corneal curvature 104 may be estimated for each of the images in the set of images employed for the calibration step 404 in the method 400 described above with reference to FIG. 4. The average of these centers 104 of corneal curvature may be employed as the reference point 1204 for the gaze tracking 407 that uses the further image. The cornea centers 104 may for example be estimated via PCCR. As described above, PCCR may perform better for small gaze angles than for large gaze angles. A fixed reference point 1204 may therefore be computed using cornea center positions 104 estimated for small gaze angles where PCCR performs well, and this reference point 1204 may be employed also for larger gaze angles where PCCR may have lower accuracy/precision. Potential errors caused by noise in PCCR computations for large gaze angles may therefore be avoided by using a fixed reference point 1204.

Figure 13:
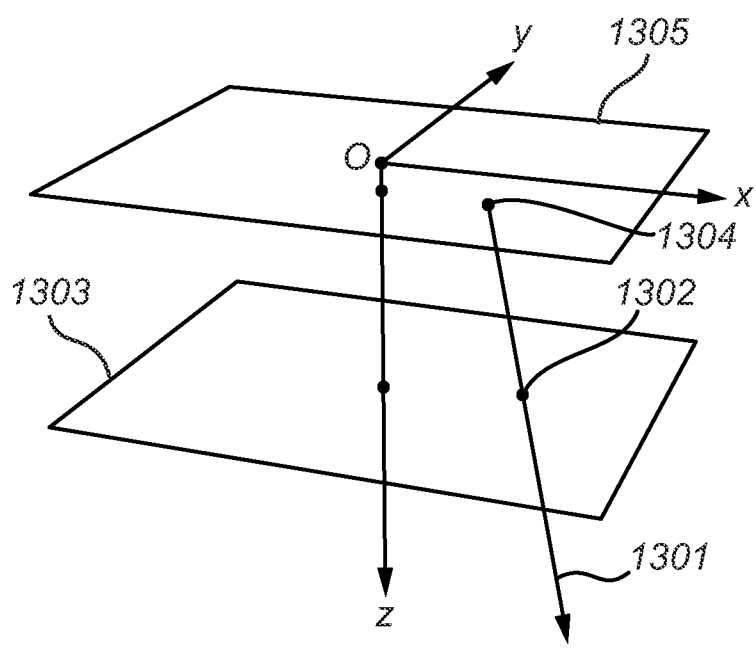

FIG. 13 illustrates an alternative way of how a gaze ray 1301 may be determined. FIG. 13 shows the coordinate system of the gaze tracking system. The coordinate system includes axes x, y and z, and an origin O of the coordinate system. The axis z is directed towards the user's face. In the present embodiment, the mapping described above with reference to FIG. 4 is adapted to map positions of the center 103 of the pupil 102 of the eye 100 in images captured by the camera 302 to gaze points 1302 of the eye 100 at a surface 1303 (like the first example mapping 510 in FIG. 5). In the present embodiment, the step 407 of performing gaze tracking using the calibrated mapping and the estimated position of the center 103 of the pupil 102 in the further image comprises estimating 1401 a gaze point 1302 at the surface 1303 by applying the mapping to the estimated position of the center 103 of the pupil 102 in the further image, and estimating 1402 a gaze direction 1301 (or gaze ray) as a line or vector through a reference point (or gaze origin) 1304 and through the estimated gaze point 1302 at the surface 1303.

In the present embodiment, the reference point 1304 is located in a cornea center plane 1305. The cornea center plane 1305 has been determined using centers 104 of corneal curvature estimated for each of the images in the set of images employed for the calibration step 404 in the method 400 described above with reference to FIG. 4. The cornea center plane 1305 is a plane orthogonal to the z axis, and with a z coordinate which is the average of the z-coordinates of the centers 104 of corneal curvature estimated for respective the images of the set of images employed for the calibration step 404. A center 104 of corneal curvature is also estimated for the further image. The reference point 1304 employed for gaze tracking 407 using the further image is computed as a projection, in the cornea center plane 1305, of the center 104 of corneal curvature estimated based on the further image. As described above, PCCR may perform better for small gaze angles than for large gaze angles. A fixed cornea center plane 1305 may therefore be computed using cornea center positions 104 estimated for small gaze angles where PCCR performs well, and this cornea center plane 1305 may be employed also for larger gaze angles where PCCR may have lower accuracy/precision. Potential errors caused by noise in PCCR computations for large gaze angles may therefore be reduced by projecting estimated cornea center positions 104 in the cornea center plane 1305.

In the examples described above with reference to FIGS. 12-13, the reference points 1204 and 1304 employed for the gaze tracking are based on the position of the center 104 of corneal curvature. However, the reference points 1204 and 1304 may for example be based on the position of the center 106 of the eye 100, instead of the center 104 of corneal curvature. In other words, the reference point 1204 (or gaze origin) employed in FIG. 12 could be the center 106 of the eye ball as estimated using the further image obtained at step 405, or could be the average of positions of the center 106 of the eye ball estimated using the set of images obtained at step 401.

Figure 15:
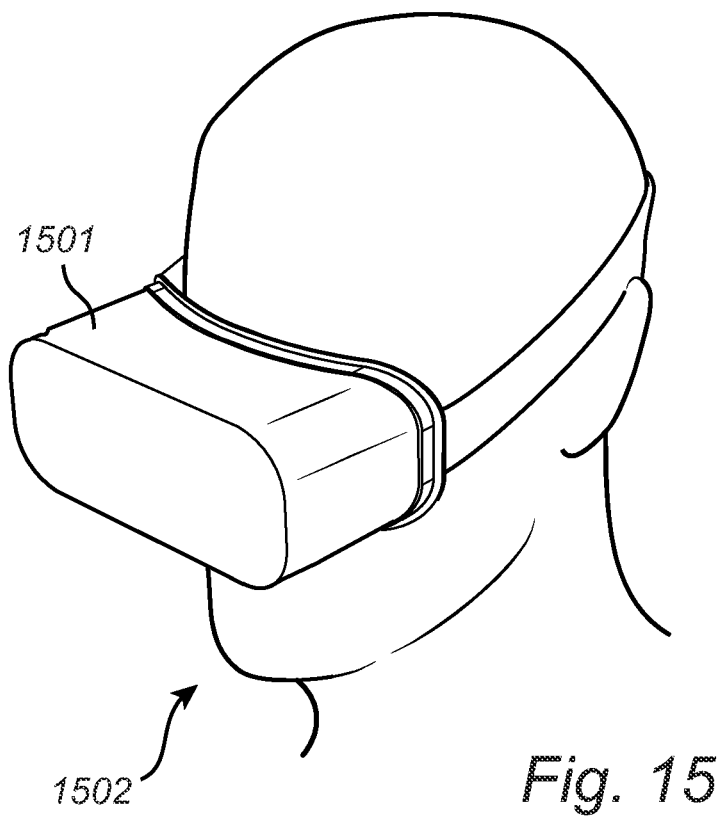
FIG. 15 shows a head-mounted device, according to an embodiment.

FIG. 15 shows a head-mounted device 1501, according to an embodiment. The head-mounted device 1501 may for example comprise the gaze tracking system 300 described above with reference to FIG. 3, or part of the gaze tracking system 300. The head-mounted device 1501 may for example comprise the camera 302, but the processing circuitry 304 could for example be located remotely from the head-mounted device 1501. Processing circuitry 304 may for example communicate with the camera 302 in the head-mounted device 1501 via wired or wireless communication. The method 400 described above with reference to FIG. 4 may for example be carried out for performing gaze tracking for the head-mounted device 1501. The method 400 may for example be performed in the head-mounted device 1501, or by processing circuitry located remotely to the head-mounted device 1501 using images captured by a camera 1302 in the head-mounted device 1501.

When the head-mounted device 1501 is worn by a user 1502, the camera 1302 is located at a fixed position relative to the user 1502. When the head-mounted device 1501 is moved relative to the user 1502 (for example due to slippage), the mapping employed for gaze tracking may be updated to compensate for the relocation of the head-mounted device 1501. For example, the calibration step 404 described above with reference to FIG. 4 may be repeated for the new position of the head-mounted device. Another way to compensate for the relocation of the head-mounted device 1501 is to apply a correction to the mapping employed for gaze tracking, as described above with reference to FIG. 9.

The head-mounted device 1501 may for example be a head-mounted display (HMD) such as a VR headset, an AR headset (such as AR glasses) or a mixed reality (MR) headset.

The methods and schemes described above with reference to FIGS. 4-14 represent a first aspect of the present disclosure. The gaze tracking system 300 described above with reference to FIG. 3 and the head-mounted device 1501 described above with reference to FIG. 15 represent a second aspect of the present disclosure. The system 300 (or the processing circuitry 304 of the system 300) may for example be configured to perform the gaze tracking method of any of the embodiments of the first aspect described above. The system 300 may for example be configured to perform the method 400 described above with reference to FIG. 4, the method 800 described above with reference to FIG. 8, or the method 900 described above with reference to FIG. 9.

According to an embodiment, the gaze tracking system 300 comprises processing circuitry 304 configured to:
  a) obtain a set of images of an eye 100 captured by a camera 302;
  b) for each image from the set of images:
    obtain gaze data indicating a point 111 at which the eye 100 was gazing when the image was captured and/or a direction 107 in which the eye 100 was gazing when the image was captured, and
    estimate a position of a center 103 of a pupil 102 of the eye 100 in the image;
  c) calibrate a mapping using the obtained gaze data and the estimated positions of the center 103 of the pupil 102, wherein the mapping is adapted to map positions of the center 103 of the pupil 102 of the eye 100 in images captured by the camera 302 to:
    gaze points 111 of the eye 100 at a surface, or
    gaze directions 107 of the eye 100;
  d) obtain a further image of the eye 100 captured by the camera 702;
  e) estimate a position of the center 103 of the pupil 102 in the further image; and
  f) perform gaze tracking using the calibrated mapping and the estimated position of the center 103 of the pupil 102 in the further image.

As described above with reference to FIG. 3, the gaze tracking system 300 need not necessarily comprise all the elements shown in FIG. 3.

A third aspect of the present disclosure is represented by embodiments of a non-transitory computer-readable storage medium 307 storing instructions which, when executed by the gaze tracking system 300, cause the gaze tracking system 300 to perform the method of any of the embodiments of the first aspect described above (such as the method 400 described above with reference to FIG. 4, the method 800 described above with reference to FIG. 8, or the method 900 described above with reference to FIG. 9).

According to an embodiment, the non-transitory computer-readable storage medium 307 stores instructions which, when executed by the gaze tracking system 300, cause the gaze tracking system 300 to:
  a) obtain a set of images of an eye 100 captured by a camera 302;
  b) for each image from the set of images:
    obtain gaze data indicating a point 111 at which the eye 100 was gazing when the image was captured and/or a direction 107 in which the eye 100 was gazing when the image was captured, and
    estimate a position of a center 103 of a pupil 102 of the eye 100 in the image;
  c) calibrate a mapping using the obtained gaze data and the estimated positions of the center 103 of the pupil 102, wherein the mapping is adapted to map positions of the center 103 of the pupil 102 of the eye 100 in images captured by the camera 302 to:
    gaze points 111 of the eye 100 at a surface, or
    gaze directions 107 of the eye 100;
  d) obtain a further image of the eye 100 captured by the camera 302;
  e) estimate a position of the center 103 of the pupil 102 in the further image; and
  f) perform gaze tracking using the calibrated mapping and the estimated position of the center 103 of the pupil 102 in the further image.

As described above with reference to FIG. 3, the storage medium 307 need not necessarily be comprised in the system 300.

The person skilled in the art realizes that the present invention is by no means limited to the preferred embodiments described above. On the contrary, many modifications and variations are possible within the scope of the appended claims. For example, the methods and schemes described above with reference to FIGS. 4-14 may be combined to form further embodiments. Further, it will be appreciated that the gaze tracking system 300 shown in FIG. 300 is merely intended as an example, and that other gaze tracking systems may also perform the methods described above with reference to FIGS. 4-14. It will also be appreciated that the method steps described with reference to FIGS. 4, 8, 9, 10, 11 and 14 need not necessarily be performed in the specific order shown in these figures.

It will be appreciated that processing circuitry 304 (or a processor) may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide computer functionality, either alone or in conjunction with other computer components (such as a memory or storage medium).

It will also be appreciated that a memory or storage medium 307 (or a computer-readable medium) may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by a processor or processing circuitry.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. In the claims, the word "or" is not to be interpreted as an exclusive or (sometimes referred to as "XOR"). On the contrary, expressions such as "A or B" covers all the cases "A and not B", "B and not A" and "A and B", unless otherwise indicated. The mere fact that certain measures are recited in mutually different dependent claims does not indicate that a combination of these measures cannot be used to advantage. Any reference signs in the claims should not be construed as limiting the scope.

The invention claimed is:

1. A gaze tracking method comprising:
obtaining a set of images of an eye captured by a camera;
for each image from the set of images:
obtaining gaze data indicating a point at which the eye was gazing when the image was captured and/or a direction in which the eye was gazing when the image was captured, and
estimating a position of a center of a pupil of the eye in the image;
calibrating a mapping using the obtained gaze data and the estimated positions of the center of the pupil, wherein the mapping is adapted to map positions of the center of the pupil of the eye in images captured by the camera to:
gaze points of the eye at a surface, or
gaze directions of the eye;
obtaining a further image of the eye captured by the camera while the eye is illuminated by an illuminator;
estimating a position of a reflection of the illuminator at a cornea of the eye in the further image;
estimating a position of the center of the pupil in the further image; and
performing gaze tracking using the calibrated mapping and the estimated position of the center of the pupil in the further image;
further comprising the steps of:
estimating whether the eye is directed towards a central region of a field of view of the eye by using the estimated position of the reflection of the illuminator and the estimated position of the center of the pupil in the further image; and
in response to the eye being directed towards a region outside said central region, outputting gaze data determined by performing gaze tracking using the calibrated mapping and the estimated position of the center of the pupil in the further image.

2. The method of claim 1, wherein an image from the set of images was captured when the eye was gazing at a stimulus point, and wherein the gaze data obtained for the image indicates a known position of the stimulus point and/or a known direction from the eye towards the stimulus point.

3. The method of claim 1, wherein the mapping is adapted to map positions of the center of the pupil of the eye in images captured by the camera to gaze points of the eye at a plane.

4. The method of claim 1, wherein the mapping is adapted to map positions of the center of the pupil of the eye in images captured by the camera to gaze points of the eye at the surface, and wherein the obtained gaze data indicates a point at said surface at which the eye was gazing when the image was captured.

5. The method of claim 1, comprising:
estimating whether the eye is directed towards a central region of a field of view of the eye; and
in response to the eye being directed towards said central region, outputting gaze data determined by performing a second type of gaze tracking different than the gaze tracking that uses the calibrated mapping and the estimated position of the center of the pupil in the further image.

6. The method of claim 1, comprising:
performing a second type of gaze tracking different than the gaze tracking that uses the calibrated mapping and the estimated position of the center of the pupil in the further image;
estimating whether the eye is directed towards a central region of a field of view of the eye, and
in response to the eye being directed towards said central region, applying a correction to said mapping based on gaze data obtained via the second type of gaze tracking.

7. The method of claim 6, wherein the second type of gaze tracking uses an estimated position of a reflection of an illuminator at a cornea of the eye in the further image and an estimated position of the center of the pupil in the further image.

8. The method of claim 1, comprising:
in response to the eye being directed towards said central region, outputting gaze data determined by performing gaze tracking using the estimated position of the reflection of the illuminator and the estimated position of the center of the pupil in the further image.

9. The method of any claim 1, wherein said central region corresponds to gaze angles smaller than a threshold value, for example gaze angles smaller than 25 degrees or gaze angles smaller than 10 degrees or gaze angles smaller than 5 degrees.

10. The method of claim 1, wherein performing gaze tracking using the calibrated mapping and the estimated position of the center of the pupil in the further image comprises:

applying a radial correction to the mapping, wherein the radial correction involves use of a correction function, wherein a size of the correction function depends on a gaze angle of the eye.

11. The method of claim 10, comprising, prior to applying the radial correction to the mapping:
obtaining a plurality of images of the eye captured by the camera when the eye was gazing at respective known stimulus points, wherein at least one of the stimulus points corresponds to a gaze angle of at least 10 degrees, for example at least 25 degrees;
estimating positions of the center of the pupil of the eye in the plurality of images; and
calibrating the correction function using positions of the known stimulus points, the estimated positions of the center of the pupil of the eye in the plurality of images, and the mapping.

12. The method of claim 1, wherein the mapping is adapted to map positions of the center of the pupil of the eye in images captured by the camera to gaze points of the eye at a surface, and wherein performing gaze tracking using the calibrated mapping and the estimated position of the center of the pupil in the further image comprises:
estimating a gaze point at said surface by applying the mapping to the estimated position of the center of the pupil in the further image; and
estimating a gaze direction as a line or vector through a reference point of the eye and through the estimated gaze point at said surface.

13. The method of claim 1, wherein the reference point of the eye is:
a center of corneal curvature estimated based on the further image; or
an average of centers of corneal curvature estimated based on the images in said set of images; or
a projection, in a cornea center plane, of a center of corneal curvature estimated based on the further image, wherein the cornea center plane is estimated based on centers of corneal curvature estimated based on the images in said set of images; or
a center of the eye estimated based on the images in said set of images and/or based on the further image.

14. A gaze tracking system comprising processing circuitry configured to:
obtain a set of images of an eye captured by a camera;
for each image from the set of images:
obtain gaze data indicating a point at which the eye was gazing when the image was captured and/or a direction in which the eye was gazing when the image was captured, and
estimate a position of a center of a pupil of the eye in the image;
calibrate a mapping using the obtained gaze data and the estimated positions of the center of the pupil, wherein the mapping is adapted to map positions of the center of the pupil of the eye in images captured by the camera to:
gaze points of the eye at a surface, or
gaze directions of the eye;
obtain a further image of the eye captured by the camera while the eye is illuminated by an illuminator,
estimate a position of a reflection of the illuminator at a cornea of the eye in the further image;
estimate a position of the center of the pupil in the further image; and
perform gaze tracking using the calibrated mapping and the estimated position of the center of the pupil in the further image;
wherein the processing circuitry is further configured to:
estimate whether the eye is directed towards a central region of a field of view of the eye by using the estimated position of the reflection of the illuminator and the estimated position of the center of the pupil in the further image; and
in response to the eye being directed towards a region outside said central region, to output gaze data determined by performing gaze tracking using the calibrated mapping and the estimated position of the center of the pupil in the further image.

15. The system of claim 14, wherein the mapping is adapted to map positions of the center of the pupil of the eye in images captured by the camera to gaze points of the eye at a surface, and wherein the processing circuitry is configured to perform the gaze tracking using the calibrated mapping and the estimated position of the center of the pupil in the further image by at least:
estimating a gaze point at said surface by applying the mapping to the estimated position of the center of the pupil in the further image; and
estimating a gaze direction as a line or vector through a reference point of the eye and through the estimated gaze point at said surface.

16. A head-mounted device comprising the system of claim 14.

17. A non-transitory computer-readable storage medium storing instructions which, when executed by a gaze tracking system, cause the gaze tracking system to:
obtain a set of images of an eye captured by a camera;
for each image from the set of images:
obtain gaze data indicating a point at which the eye was gazing when the image was captured and/or a direction in which the eye was gazing when the image was captured, and
estimate a position of a center of a pupil of the eye in the image;
calibrate a mapping using the obtained gaze data and the estimated positions of the center of the pupil, wherein the mapping is adapted to map positions of the center of the pupil of the eye in images captured by the camera to:
gaze points of the eye at a surface, or
gaze directions of the eye;
obtain a further image of the eye captured by the camera while the eye is illuminated by an illuminator;
estimate a position of a reflection of the illuminator at a cornea of the eye in the further image;
estimate a position of the center of the pupil in the further image; and
perform gaze tracking using the calibrated mapping and the estimated position of the center of the pupil in the further image;
wherein the gaze tracking system is further caused to:
estimate whether the eye is directed towards a central region of a field of view of the eye by using the estimated position of the reflection of the illuminator and the estimated position of the center of the pupil in the further image; and
in response to the eye being directed towards a region outside said central region, to output gaze data determined by performing gaze tracking using the calibrated mapping and the estimated position of the center of the pupil in the further image.

* * * * *